(12) United States Patent
Weh et al.

(10) Patent No.: US 7,992,300 B1
(45) Date of Patent: Aug. 9, 2011

(54) METHOD OF ASSEMBLING A HYDRAULIC FLUID ACCUMULATOR

(75) Inventors: Andreas Weh, Rappoiz (DE); Bernhard Gnamm, Summerville, SC (US)

(73) Assignee: Robert Bosch GmbH, Stuttgart (DE)

( * ) Notice: Subject to any disclaimer, the term of this patent is extended or adjusted under 35 U.S.C. 154(b) by 1287 days.

(21) Appl. No.: 11/565,095

(22) Filed: Nov. 30, 2006

(51) Int. Cl.
*B21D 51/16* (2006.01)
(52) U.S. Cl. ..................................... 29/890.06
(58) Field of Classification Search ............... 29/890.06; 188/322.15, 322.16; 267/64.11
See application file for complete search history.

(56) References Cited

U.S. PATENT DOCUMENTS 4,718,647 A * 1/1988 Ludwig ............... 267/64.11

* cited by examiner

*Primary Examiner* — Rick K Chang
(74) *Attorney, Agent, or Firm* — Maginot, Moore & Beck

(57) ABSTRACT

A method of assembling a hydraulic fluid accumulator in a bore defined in a housing structure is disclosed. The method includes (a) inserting an annular seal into a second bore portion of the bore so that the annular seal is positioned in contact with the first ledge, (b) inserting a piston into the bore so that the piston is located in a first bore portion of the bore as well as the second bore portion of the bore, and (c) inserting a cover having an annular rim into the bore so that (i) the annular rim is positioned in contact with the annular seal, and (ii) the annular seal is located in an annular space defined by the first ledge, the annular rim, the piston, and an internal wall of the housing structure that partially defines the second bore portion.

8 Claims, 3 Drawing Sheets

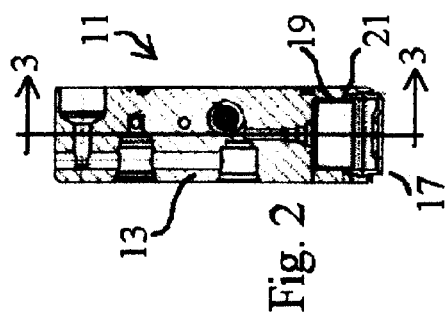
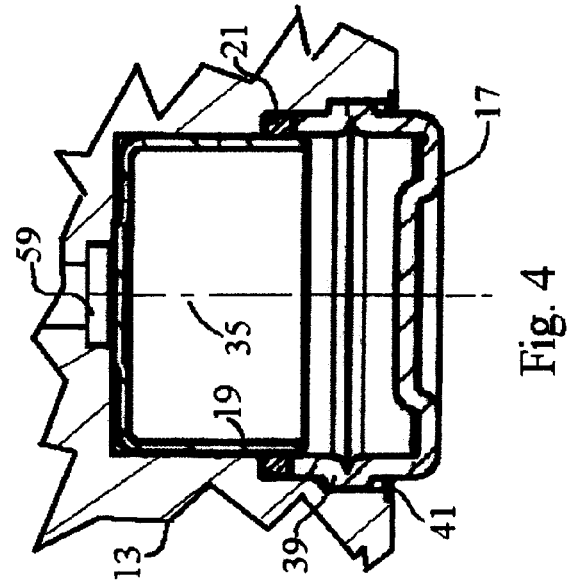
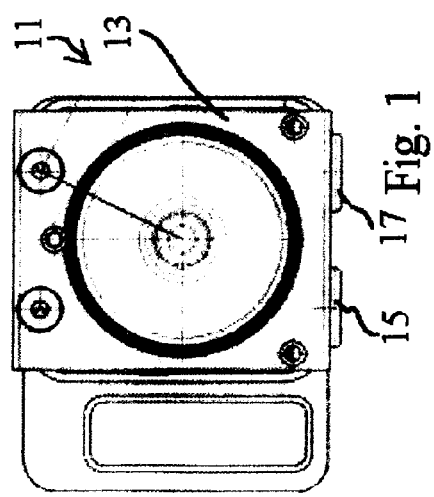
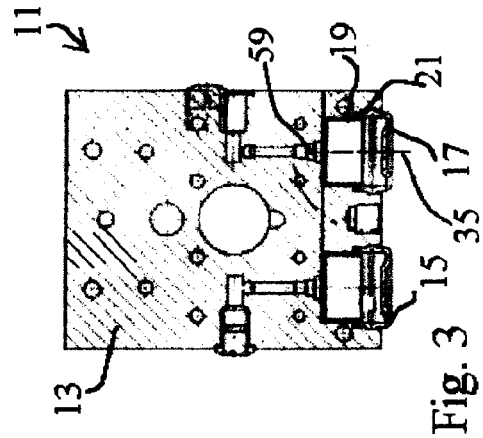

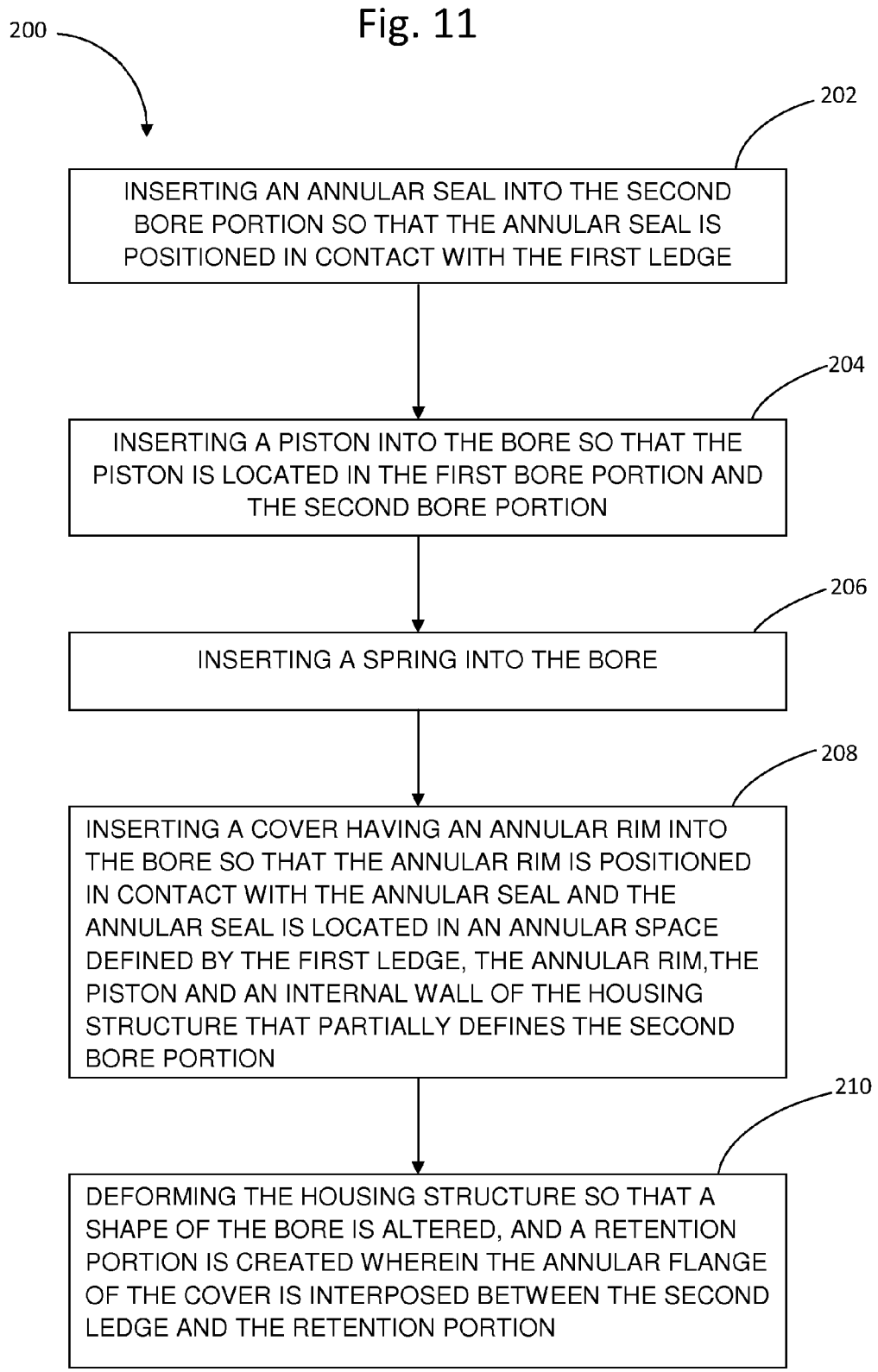

METHOD OF ASSEMBLING A HYDRAULIC FLUID ACCUMULATOR

The present invention relates to hydraulic systems generally, and more particularly to apparatus and a process for making a hydraulic reservoir such as a fluid accumulator.

BACKGROUND OF THE INVENTION

Many known anti-lock devices operate by cyclically increasing and decreasing the braking force exerted on the wheels so that a wheel having a tendency to lock is permitted to re-accelerate back toward a speed corresponding to the speed of the vehicle. This is typically achieved by control valves alternately allowing fluid to flow out of and then into the brake cylinder to first lower and then raise the brake pressure in the brake system. Some anti-lock braking systems (ABS) employ a pump-back scheme where fluid is dumped from the wheel cylinder to a local accumulator and the same hydraulic fluid is re-supplied from the local accumulator to the brake pad actuators.

Most of such anti-lock braking systems are further capable of operating in a traction control mode (sometimes called "dynamic rear proportioning"). Traction control and anti-lock operation are both responses to aberrant vehicle wheel behavior. A traction control function is established by detecting conditions where the rotational speed of a first powered wheel substantially exceeds that of a second powered wheel. To provide a power balance in the operation of the vehicle, a braking force is applied to the powered wheel rotating at a higher speed to effectively transfer driving torque back to the other wheel that has better traction. Many anti-lock systems having such a traction control feature employ a motor and hydraulic pump or pumps which operate independent of the service braking system to supply fluid from a local accumulator to brake the wheel which has lost traction. The same local accumulator may be utilized during either mode of operation.

With additional sensors, such as accelerometers, monitoring a plurality of additional vehicle operating parameters, e.g., vehicle yaw, electronic stability programs (ESP) are providing enhanced vehicle safety. Like anti-lock and traction control, the ESP systems utilize hydraulic pumping units with one or more fluid accumulators responsive to the monitored parameters to selectively brake certain wheels and maintain vehicle control.

In all these systems, it is desirable to have an immediately available source of hydraulic pressure to selectively apply a corrective braking force in response to certain sensed anomalies and to provide a temporary storage location to which fluid may be vented. With new designs and additional features, it becomes increasingly important to minimize the size and weight of the pump/reservoir units and to adapt those units to a variety of specific configurations. For example, pistons of various axial lengths may be employed in a common diameter accumulator. Moreover, ease and economy of manufacture are important. Prior designs do not allow spacing the seal ring at an advantageous depth, therefore, the piston length and housing depth is unnecessarily long. The used material is not optimized.

The reservoir bore for ESP brake systems is sealed off by an elastomer seal ring and a staked, crimped or orbital riveted-in closing cover. The reservoir is typically a stroke piston design. The seal ring requires a groove for its retention. This groove is formed by a step in the reservoir bore that is machined into the reservoir bore, and the lip or rim of the closing cover. Due to the reservoir size it is highly desirable to be able to place the seal ring at any desirable depth in the reservoir bore to optimize material, stroke and design and therefore cost. It is also desirable that only one component to be used for the assembly. Two components, a cover and a spacer ring, are possible but would make the design and assembly unnecessary complicated and complex.

SUMMARY OF THE INVENTION

The present invention provides a unique design which allows the seal element to be placed at a step in the ESP housing at any advantageous depth. The collar of the closing cover is uniquely formed in the wall of the cover to allow the seal ring groove to be placed at any desirable depth in the bore. This allows optimizing the length and the stroke of the piston to reduce the size of the components, as well as minimizing the depth of the bore which results in a reduction of material required for the piston and the housing. This feature formed in the wall of the cover also eliminates the need for a separate spacer to be added to the assembly for the purpose of retaining the assembly into the housing.

The invention comprises, in one form thereof, a method of forming a cover and enclosing a piston and annular seal within a bore of a hydraulic reservoir by deep drawing a generally cylindrical cup from a single sheet of metal to have one open end with an annular rim for engaging one seal surface and one closed end, and bending and folding an intermediate portion of the cylinder to create a radially outwardly extending collar intermediate the ends. Thus, the collar is formed at a preferred axial location for accommodating the piston axial length. The step of bending and folding is performed at an axial location closer to the open end to accommodate axially longer pistons and further from the open end to accommodate axially shorter pistons. The bore may be counterbored at a greater diameter to a depth less than the bore depth to form a seal receiving ledge and an annular seal inserted into the bore to engage the seal receiving ledge. The cover open end is inserted into the bore to engage and position the seal in an annular groove defined axially between the cover open end and the seal receiving ledge and radially by the bore counterbore diameter, whereby the seal is appropriately located and retained within the bore. The bore may be counterbored at a second still greater diameter to a lesser depth to form a cover insertion limiting ledge and the bore deformed as by crimping to retain the cover at the insertion location.

Also in general and in one form of the invention, a method of assembling a hydraulic fluid accumulator in a pre-existing cylindrical bore of a predetermined diameter and depth, includes the selection a piston of a preferred axial length and fixed common diameter matched to the bore diameter and counterboring the bore at a greater diameter to a depth determined by the selected piston to form a seal receiving ledge. The annular seal is then inserted into the bore followed by the annular end of a cover which engages and positions the seal in an annular groove defined axially between the cover end and receiving ledge, and radially by the bore counterbore diameter, whereby the seal is appropriately located within the bore for the particular selected piston length. The selected piston and a bias spring are inserted into the bore after inserting the annular seal and prior to inserting the cover. The cover has an annular crimping flange located axially along the cover to match to a particular piston axial length.

An advantage of the present invention is material and component optimization of the components and housing size is achieved by placing the seal ring at an optimized depth in the reservoir bore.

Another advantage is that only one component rather than a separate spacing ring need be assembled.

A further advantage is that the seal groove can be placed at any depth by the closing cover extension and a simple stepped diameter in the housing, whereas in prior designs, the O-ring can be placed only on one location at the closing cover face.

BRIEF DESCRIPTION OF THE DRAWINGS

FIG. 1 is a front elevation view of a hydraulic pump unit incorporating the invention in one form;

FIG. 2 is a cross-sectional view of the unit from the right side of FIG. 1;

FIG. 3 is a cross-sectional view along lines 3-3 of FIG. 2;

FIG. 4 is an enlarged cross-sectional view of a portion of the unit of FIG. 3 showing one hydraulic reservoir;

FIG. 11 is a flow chart depicting a method of assembling the accumulator of the present disclosure.

Corresponding reference characters indicate corresponding parts throughout the several drawing views.

DETAILED DESCRIPTION OF THE INVENTION

Figure 7:
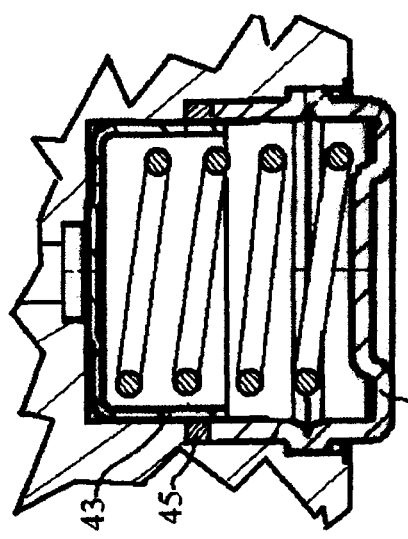
FIG. 7 is a cross-sectional view similar to FIG. 5, but showing a piston of reduced axial length and a cover of increased axial length.

Referring now to the drawings and particularly to FIG. 1, there is shown a hydraulic pump unit 11, for example, of an ESP system having a housing 13 with a pair of caps or covers 15 and 17 visible along one edge. FIGS. 2 and 3 are orthogonal sectional views along a common accumulator or reservoir center line such as axis 35. The housing contains two accumulators with an illustrative accumulator portion shown in greater detail in FIG. 4. The accumulator includes a piston 19 and a seal ring 21 positioned within a housing bore and enclosed by cover 17.

Figure 5:
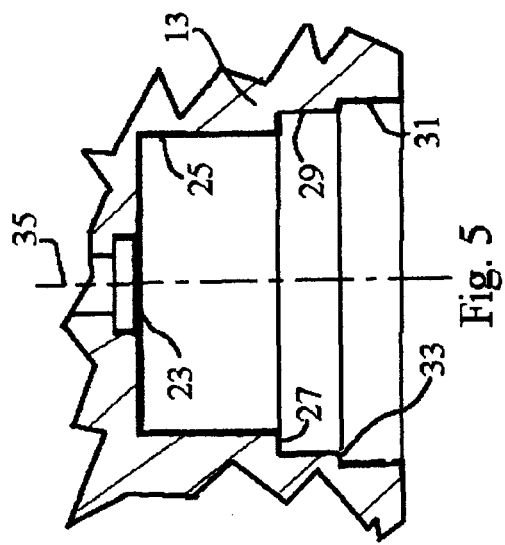
FIG. 5 is a cross-sectional view of the housing portion of FIG. 4.

Comparing FIGS. 4 and 5, the housing bore in which the piston 19 is positioned is generally cylindrical extending to a depth indicated by end 23 and of a diameter indicated by sidewall 25. There is a counterbored region of greater diameter as indicated by sidewall 29 bored to a lesser depth forming a step or ledge at 27. The ledge 27 receives the seal ring 21 and limits the depth to which the seal may be inserted into the bore. A still greater diameter counterbore forms sidewall 31 to a depth shown by the ledge 33. This ledge 33 receives the cover flange or collar 39, limits cover insertion into the bore, and properly locates the cover lip 41 to complete a groove in which the seal ring 21 resides. The cover is then retained in this location, for example, by crimping at 41.

Figure 6:
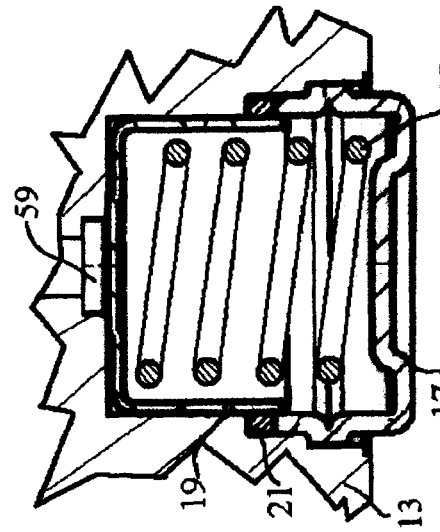
FIG. 6 is a cross-sectional view similar to FIG. 4, but showing a piston bias spring within the reservoir.

In FIG. 6, a typical accumulator spring 37 has been added. Spring 37 urges piston 19 upwardly as viewed. When pressure fluid is supplied to port 59, the piston moves downwardly against the spring bias and fluid enters the accumulator to be later expelled therefrom by the force of the spring. FIG. 7 illustrates an accumulator of lesser capacity having a shorter stroke piston 43. Comparing FIGS. 6 and 7, it will be noted that the axial length of piston 43 is less than the axial length of piston 19. The length of the piston 43 skirt is sufficiently short that the piston skirt would no longer engage the seal 21 in the location shown in FIG. 6. To compensate, seal 45 has been relocated to a greater depth in the housing bore as shown in FIG. 7. This relocation requires the ledge 27 of FIG. 5 to be deeper in the bore. Also, the rim 41 of cover 17 would not extend sufficiently far into the bore to appropriately confine the seal. Hence, cover 47 has been modified to provide rim 49 at an appropriate location to complete the seal 45 receiving groove.

Figure 9:
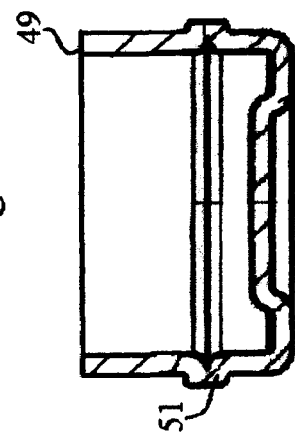
FIG. 9 is a cross-sectional view of the cup-shaped cover of FIG. 7.
Figure 8:
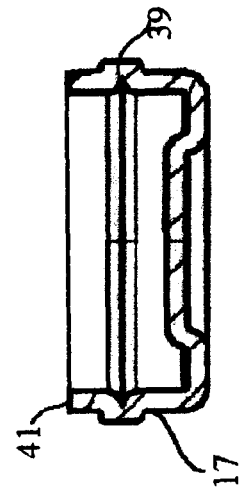
FIG. 8 is a cross-sectional view of the cup-shaped cover of FIGS. 4 and 6.
Figure 10:
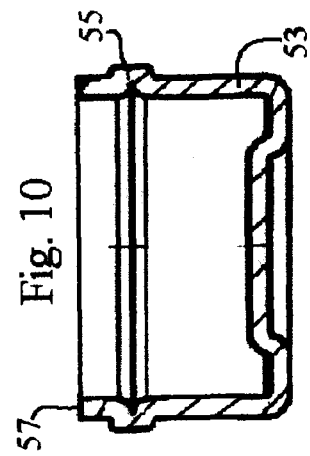
FIG. 10 is a cross-sectional view of a cup-shaped cover of the same axial length as in FIGS. 7 and 9, but suitable for use with the piston shown in FIG. 6.

The cover 17 of FIGS. 2-6 is shown separately as FIG. 8 while the cover 47 of FIG. 7 is shown separately as FIG. 9. Comparing FIGS. 8 and 9, the cover of FIG. 9 is deeper and the separation between the flange 51 and rim 49 is greater, while the distance from the cup bottom or closed end to the flange remains unchanged. That the covers for the FIGS. 6 and 7 accumulators need not be of different overall length is shown by cover 53 of FIG. 10. Here, the flange 55 is located at an appropriate distance from rim 57 (the same distance as in FIG. 8) to provide proper seal seating and retention crimping in the accumulator of FIG. 6. Of course, the cover 53 would extend further beyond the housing 13 than does the cover 17. By this technique, the seal may be located axially as desired by appropriate boring of the depth of a ledge such as 27 and the separation between the cover flange such as 55 and cover rim such as 57.

Formation and assembly of the reservoir and cover includes an initial boring of the housing 19 to a depth forming the cylindrical end 23 and sidewall 25 as seen in FIG. 5. A piston of a preferred axial length and a diameter matched to the sidewall diameter is then selected, that is, the specifications or parameters of piston to be employed are determined. Identification of a particular piston need not occur until assembly of that piston into the bore. The piston axial length determines the depth 27 to which a second larger diameter counterboring is performed to form a seal receiving ledge at 27. After an annular seal 21 is inserted into the bore, the cover such as 17, 47 or 53 having an annular end 41, 49 or 57 is inserted into the bore to engage and position the seal in an annular groove defined axially between the cover end and receiving ledge, and radially by the bore counterbore diameter 29, whereby the seal is appropriately located within the bore for the particular selected piston. Of course, the piston 19 or 43 and spring 37 are typically inserted into the bore after inserting the annular seal and prior to inserting the cover. The counterboring also includes counterboring the bore at a second still greater diameter forming sidewall 31 and to a lesser depth to form a cover insertion limiting ledge at 33. The depth 27 of the greater diameter counterbore varies for various diameter pistons while the still greater diameter bore depth 33 is constant and independent of the piston selected. Finally, the bore is deformed as by crimping at 41 to retain the cover at the insertion location.

A cover having an annular crimping flange 39, 51 or 55 located axially along the cover at a location matched to a particular axial length piston is formed by deep drawing a generally cylindrical cup from a single sheet of metal to have one open end with an annular rim for engaging one seal surface and one closed end, and bending and folding an intermediate portion of the cylinder to create a radially outwardly extending collar 39, 51 or 55 intermediate the cover ends. The collar is formed at a preferred axial location for accommodating the piston axial length which is closer to the open end to accommodate axially longer pistons and further from the open end to accommodate axially shorter pistons. The bending and folding of a collar on deep drawn components are state of the art for assembly purposes. Similar designs and forming of a collar are known from, e.g., fuel damper housings.

As stated above, the housing 13 contains two accumulators with an illustrative accumulator shown in greater detail in FIG. 4. Another manner of describing the method of assembling the accumulator of the present disclosure is set forth below with reference to the flow chart 200 depicted in FIG. 11. Note the housing structure 13 defines a bore as shown in FIG. 5. As clearly shown in FIG. 5, the bore includes a first bore portion having a first diameter, (ii) a second bore portion having a second diameter that is greater than the first diameter, and (iii) a third bore portion having a third diameter that is greater than the second diameter. Also, as shown in FIG. 5, the housing structure 13 includes a first ledge 27 that partially defines the second bore portion, and a second ledge 33 that partially defines the third bore portion. With reference to FIG. 11, the method of assembling the accumulator includes the step 202 of inserting the annular seal 21 into the second bore portion so that the annular seal 21 is positioned in contact with the first ledge 27. The method further includes the step 204 of inserting a piston 19, 43 into the bore so that the piston is located in the first bore portion and the second bore portion as shown in FIGS. 4, 6, and 7. The method further includes the step 206 of inserting a spring 37 into the bore. Note that the piston 19, 43 defines a first cavity, and a first end portion of the spring 37 is inserted into the first cavity of the piston 19, 43 as shown in FIGS. 6 and 7. The method further includes the step 208 of inserting the cover 17, 43, 53 having an annular rim 41, 49, 57 into the bore so that (i) the annular rim 41, 49, 57 is positioned in contact with the annular seal 21, and (ii) the annular seal 21 is located in an annular space defined by the first ledge 27, the annular rim 41, 49, 57, the piston 19, 43, and an internal wall of the housing structure 13 that partially defines the second bore portion. Note that the cover 17, 43, 53 defines a second cavity, and a first end portion of the spring 37 is inserted into the second cavity of the cover as shown in FIGS. 6 and 7. Note also that the housing structure 13 further includes the second ledge 33 that partially defines the third bore portion. The cover 17, 47, 53 further has a sidewall and an annular flange 39, 51, 55 extending outwardly from the sidewall. The step 208 includes positioning the cover 17, 47, 53 in the third bore portion so that the annular flange 39, 51, 55 contacts the second ledge 33. The method further includes the step 210 of deforming the housing structure 13 so that a shape of the bore is altered and a retention portion is created as shown in FIGS. 4, 6, and 7. Note that, as shown in FIGS. 4, 6, and 7, the annular flange 39, 51, 55 of the cover 17, 47, 53 is interposed between the second ledge 33 and the retention portion.

Thus, while a preferred embodiment has been disclosed, numerous modifications will occur to those of ordinary skill in this art. Accordingly, the scope of the present invention is to be measured by the scope of the claims which follow.

What is claimed is:

1. A method of assembling a hydraulic fluid accumulator in a bore defined in a housing structure, the bore including (i) a first bore portion having a first diameter, (ii) a second bore portion having a second diameter that is greater than the first diameter, and (iii) a third bore portion having a third diameter that is greater than the second diameter, and the housing structure including a first ledge that partially defines the second bore portion, comprising:
  (a) inserting an annular seal into the second bore portion so that the annular seal is positioned in contact with the first ledge;
  (b) inserting a piston into the bore so that the piston is located in the first bore portion and the second bore portion; and
  (c) inserting a cover having an annular rim into the bore so that (i) the annular rim is positioned in contact with the annular seal, and (ii) the annular seal is located in an annular space defined by the first ledge, the annular rim, the piston, and an internal wall of the housing structure that partially defines the second bore portion.

2. The method of claim 1, wherein step (c) includes the step of inserting the cover into the bore so that (i) the annular rim is located in the second bore portion, and (ii) the cover extends completely through the third bore portion.

3. The method of claim 1, wherein:
  the housing structure further includes a second ledge that partially defines the third bore portion,
  the cover further has a sidewall and an annular flange extending outwardly from the sidewall, and
  the step (c) includes positioning the cover in the third bore portion so that the annular flange contacts the second ledge.

4. The method of claim 3, further comprising:
  (d) deforming the housing structure so that (i) a shape of the bore is altered, and (ii) a retention portion is created, wherein the annular flange of the cover is interposed between the second ledge and the retention portion.

5. The method of claim 1, wherein:
  step (a) is performed before step (b), and
  step (b) is performed before step (c).

6. The method of claim 1, further comprising:
  (d) inserting a spring into the bore after step (b) and before step (c).

7. The method of claim 6, wherein:
  the piston defines a first cavity, and
  step (d) includes inserting a first end portion of the spring into the first cavity of the piston.

8. The method of claim 7, wherein:
  the cover defines a second cavity, and
  step (c) includes inserting the cover into the bore so that a second end portion of the spring is located in the second cavity of the cover.

* * * * *

UNITED STATES PATENT AND TRADEMARK OFFICE
CERTIFICATE OF CORRECTION

| | |
|---|---|
| PATENT NO. | : 7,992,300 B1 |
| APPLICATION NO. | : 11/565095 |
| DATED | : August 9, 2011 |
| INVENTOR(S) | : Weh et al. |

It is certified that error appears in the above-identified patent and that said Letters Patent is hereby corrected as shown below:

On the Title Page at (75) Inventors:

Please delete "Rappoiz" and insert --Rappolz-- in its place.

Signed and Sealed this
Thirtieth Day of October, 2012

David J. Kappos
*Director of the United States Patent and Trademark Office*